United States Patent
Shemesh et al.

(10) Patent No.: US 12,433,275 B2
(45) Date of Patent: Oct. 7, 2025

(54) FISHING LURE, ASSEMBLY AND RELATED METHOD

(71) Applicant: WOLFPACK TACKLE, INC., Warminster, PA (US)

(72) Inventors: Ilan Shemesh, Warminster, PA (US); Jeff Warford, Warminster, PA (US)

(73) Assignee: Wolfpack Tackle, Inc, Warminster, PA (US)

( * ) Notice: Subject to any disclaimer, the term of this patent is extended or adjusted under 35 U.S.C. 154(b) by 92 days.

(21) Appl. No.: 18/139,630

(22) Filed: Apr. 26, 2023

(65) Prior Publication Data
US 2023/0337648 A1 Oct. 26, 2023

Related U.S. Application Data (60) Provisional application No. 63/334,718, filed on Apr. 26, 2022.

(51) Int. Cl.
*A01K 85/00* (2006.01)
*A01K 85/08* (2006.01)

(52) U.S. Cl.
CPC .......... *A01K 85/1823* (2022.02); *A01K 85/08* (2013.01)

(58) Field of Classification Search
CPC .... A01K 85/1823; A01K 85/08; A01K 85/18; A01K 85/1811; A01K 85/1813; A01K 85/1821; A01K 85/00
USPC .............. 43/42.09, 35, 42.24, 42.26, 42.28
See application file for complete search history.

(56) References Cited

U.S. PATENT DOCUMENTS

| | | | | |
|---|---|---|---|---|
| 1,847,504 A | * | 3/1932 | Vollett | A01K 85/16 43/35 |
| 2,589,343 A | * | 3/1952 | Cieslik | A01K 83/02 43/35 |
| 2,640,292 A | * | 6/1953 | Nadolny | A01K 85/16 43/41 |
| 2,659,175 A | * | 11/1953 | Carpenter | A01K 85/16 43/42.36 |
| 2,994,982 A | * | 8/1961 | Murawski | A01K 85/02 43/42.35 |
| 5,526,602 A | * | 6/1996 | Day, Sr. | A01K 85/01 43/37 |
| 2005/0235550 A1 | * | 10/2005 | Oelerich | A01K 85/00 43/42.26 |
| 2006/0016118 A1 | * | 1/2006 | Zuk | A01K 85/18 43/43.12 |
| 2006/0143972 A1 | * | 7/2006 | Nichols | A01K 85/18 43/42.09 |
| 2008/0168700 A1 | * | 7/2008 | Kim | A01K 85/00 43/42.24 |
| 2010/0162612 A1 | * | 7/2010 | Kalnas | A01K 85/18 43/42.4 |
| 2017/0188561 A1 | * | 7/2017 | Pettet | H02J 7/0045 |
| 2019/0008128 A1 | * | 1/2019 | Walsh | A01K 85/16 |

(Continued)

FOREIGN PATENT DOCUMENTS

WO WO-2015112161 A1 * 7/2015 ............. A01K 85/00

*Primary Examiner* — Zoe Tam Tran
(74) *Attorney, Agent, or Firm* — Patterson + Sheridan, LLP (57) ABSTRACT

A fishing lure includes a central body and an elastomer cover that covers fully or partially the central body. Eyes are molded in the elastomer cover and a stabilizer is mounted to a rear of the central body. A hair collar and hair are removably mounted between the stabilizer and the elastomer cover.

23 Claims, 6 Drawing Sheets

(56) References Cited

U.S. PATENT DOCUMENTS

2020/0077640 A1\* 3/2020 Jarboe ................ A01M 31/06
2020/0352148 A1\* 11/2020 Mancini ............... A01K 85/01

\* cited by examiner

FISHING LURE, ASSEMBLY AND RELATED METHOD

CROSS-REFERENCE TO RELATED APPLICATION

The present application claims the benefit of U.S. Provisional Patent Application No. 63/334,718, filed on Apr. 26, 2022 and titled "Fishing Lure, Assembly and Related Method" the entire contents of which is incorporated herein by reference in its entirety.

BACKGROUND OF THE INVENTION

Existing fishing lure products in the market include a lead central body that is usually painted and has eyes that are glued and connected via other means to the central body. The paint of these prior art fishing lures tends to chip, the eyes wear and detach from the lead central body and the lead central body has a tendency to spin when trolling, thereby providing an unnatural appearance to target fish.

In addition, the existing fishing lures include hair is tied directly to the central body, which makes it almost impossible to replace or interchange the hair if the hair becomes worn and damages or the user desired use of a different color and/or variety of hair. Also, during fishing, direct connection of the hair to the central body eliminates the possibility that the hair may be removed from the central body and stored for later use. This is undesirable because the hair may not be removed for safe storage or for replacement with different styles or colors of hair.

Existing products in the market have a large opening in the back of the central body that does not allow bait to lock into the central body. The bait can therefore spin behind the central body while trolling. This is undesirable because the attached bait has an unnatural look or appearance as it flows through the water and is less desirable to target fish.

Existing products in the market do not have a mechanism to allow for attachable apparatus or components, such as a tail, to be connected, as the tail of the prior art lures are solid without a hollow or snap fit feature for connecting the tail. The tail of the prior art lures are attached to a hook of the lure by puncturing the solid end of the tail and forcing the tail onto the hook. This is undesirable because weather conditions, seasons and time of day may require different types and varieties of components for an idea lure during the time and conditions, thereby requiring many lures having variations if an individual lure may not be changed and adapted based on weather conditions, seasons and/or time of day. It is also desirable to easily and quickly remove and replace a tail, preferably without damaging the tail during the removal and replacement process. Removal and replacement of the prior known tails often damages the solid portion of the prior art tails during attachment to the hook, thereby making reattachment of the same tail unlikely and inefficient.

The preferred invention addresses the shortcomings of the prior art lures, improving performance and adaptability of the lure such that the user is able to modify the appearance and improve the function of the lure during use.

BRIEF SUMMARY OF THE INVENTION

Briefly stated, the preferred invention relates to fishing lures and more particularly to a fishing lure used while trolling or casting. A preferred embodiment disclosed herein relates to a fishing lure having a central body and an elastomer that is connected to the central body. The preferred fishing lure includes a durable interchangeable elastomer, which allows the user to change the lure color and reduces or eliminates the problem of chipping paint that is prevalent with prior art fishing lures and eyes becoming disconnected from the lead painted central body of prior art fishing lures.

Certain portions of the fishing lure are preferably constructed from soft elastomers to perform correctly and to securely snap fit onto the central body. The elastomeric portion of the preferred fishing lure is constructed from two different hardness elastomers for secure connection to the central body and for life-like performance of the elastomeric portion during use. The part of the elastomeric portion that attaches to the central body is constructed of a harder elastomer to allow for a more secure snap fit to the central body and the rest of the elastomeric portion is constructed from a softer elastomer which allows for high performance.

The preferred fishing lure allows the hair to be stored separately from the central body, and to be replaced and interchanged with different colors. The preferred ballyhoo stabilizer allows the user to lock the bait fish bill into the back of the central body via a slit during use. Additionally, the preferred central body is keel weighted, which generally prevents or strictly limits spinning or rotation of the bait while trolling, thereby creating a more realistic appearance of the preferred fishing lure to the target fish.

In another aspect, the preferred invention is directed to a fishing lure for trolling and providing a natural appearance of a fish when moving through water. The fishing lure includes a central body including a nose, a middle portion and a rear and an elastomer cover covering the nose of the central body. The elastomer cover includes an eye molded thereon. A stabilizer is mounted to the rear of the central body. A hair collar and hair are removably mounted between the stabilizer and the elastomer cover.

In an additional aspect, the preferred invention is directed to a tail for a fishing lure for removable connection to a central body of the fishing lure. The tail includes a first portion having a first hardness. The first portion may be a front portion and the front portion may include a snap fit mechanism for removable connection to the central body. The tail also includes a second portion having a second hardness. The first hardness is greater than the second hardness. The second portion may be a rear portion but is not so limited and the positioning of the first and second portions of the tails may be positioned nearly anywhere on the body of the tail.

In a further aspect, the preferred invention is directed to a fishing lure for trolling and providing a natural appearance of a fish when moving through water. The fishing lure includes a central body including a nose, a middle portion, a rear portion, a lower portion and a top portion. The lower portion is weighted relative to the top portion such that the lower portion generally remains below the upper portion as the fishing lure moves through the water. A stabilizer is removably mountable to the rear of the central body. The stabilizer is removably connectable to the central body with a snap fit mechanism. The stabilizer includes a slot configured for attachment of a bait fish to the central body.

The preferred fishing lure allows you to connect different apparatus such as tails via a snap fit directly or indirectly to the central body without moving in relationship to each other. Also, the preferred fishing lure includes a pre-molded cavity for the hook, forcing the hook to be in line with the central body and further avoid or strictly limiting spinning of the lure during use.

BRIEF DESCRIPTION OF THE SEVERAL VIEWS OF THE DRAWINGS

The foregoing summary, as well as the following detailed description of a preferred embodiment of the fishing lure, assembly and related method of the present application, will be better understood when read in conjunction with the appended drawings. For the purposes of illustrating the fishing lure, assembly and related method, there is shown in the drawings a preferred embodiment. It should be understood, however, that the application is not limited to the precise arrangements and instrumentalities shown. In the drawings.

DETAILED DESCRIPTION OF THE INVENTION

Certain terminology is used in the following description for convenience only and is not limiting. Unless specifically set forth herein, the terms "a", "an" and "the" are not limited to one element but instead should be read as meaning "at least one". The words "right", "left", "lower" and "upper" designate directions in the drawings to which reference is made. The words "inwardly" or "distally" and "outwardly" or "proximally" refer to directions toward and away from, respectively, the patient's body, or the geometric center of the preferred fishing lure and related parts thereof. The words, "anterior", "posterior", "superior," "inferior", "lateral," "proximal," "distal," and related words and/or phrases designate preferred positions, directions and/or orientations relative to the fishing lure and its components to which reference is made and are not meant to be limiting. The terminology includes the above-listed words, derivatives thereof and words of similar import.

It should also be understood that the terms "about," "approximately," "generally," "substantially" and like terms, used herein when referring to a dimension or characteristic of a component of the preferred invention, indicate that the described dimension/characteristic is not a strict boundary or parameter and does not exclude minor variations therefrom that are functionally the same or similar, as would be understood by one having ordinary skill in the art. At a minimum, such references that include a numerical parameter would include variations that, using mathematical and industrial principles accepted in the art (e.g., rounding, measurement or other systematic errors, manufacturing tolerances, etc.), would not vary the least significant digit.

Figure 1:
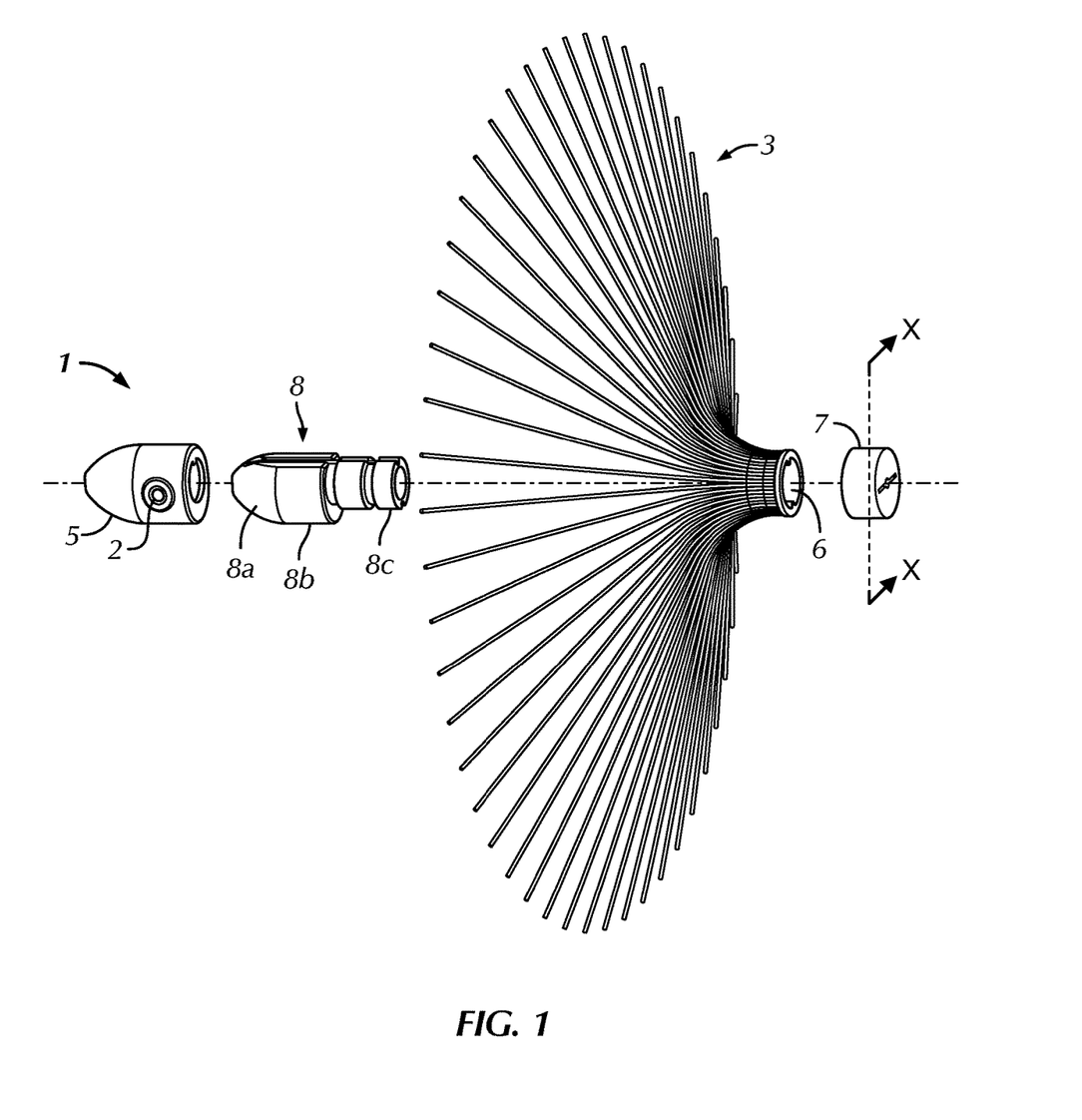
FIG. 1 illustrates an exploded, side perspective view of the preferred fishing lure of the present invention.

Referring to FIG. 1, a preferred assembly of a fishing lure, generally designated 1, in accordance with the exemplary embodiment of the present invention, includes an elastomer cover 5 that covers a central body 8 of the preferred fishing lure 1 in the mounted configuration. The fishing lure 1 is preferably configured for trolling and providing a natural appearance of a fish when the fishing lure 1 is moving through the water, preferably as the fishing lure 1 is pulled or drawn through the water. The central body 8 includes a nose 8a, a middle portion 8b and a rear 8c. The nose 8a has a generally rounded cone shape that is interrupted at a top portion, as is described in greater detail below for weighting the fishing lure 1. The elastomer cover 5 includes eyes 2 or first and second eyes 2 bonded directly to or co-molded with the elastomer cover 5 that are preferably positioned at opposite sides of the central body 8 in the mounted configuration. The elastomer cover 5 covers the nose 8a and the middle portion 8b of the central body 8 in the mounted configuration. The elastomer cover 5 is preferably constructed of a strong, resilient elastomeric material, such as silicone, that is able to take on the size and shape of the elastomer cover 5, withstand the normal operating conditions of the elastomer cover 5 and perform the preferred functions of the elastomer cover 5, as described herein. The elastomer cover 5 may be removed and replaced or is removably mountable to the central body 8 to modify the appearance and/or performance of the fishing lure 1. The elastomer cover 5 may have different colors, ornamental appearances or other features that may be attractive to a fish when moving through the water.

Figure 2:
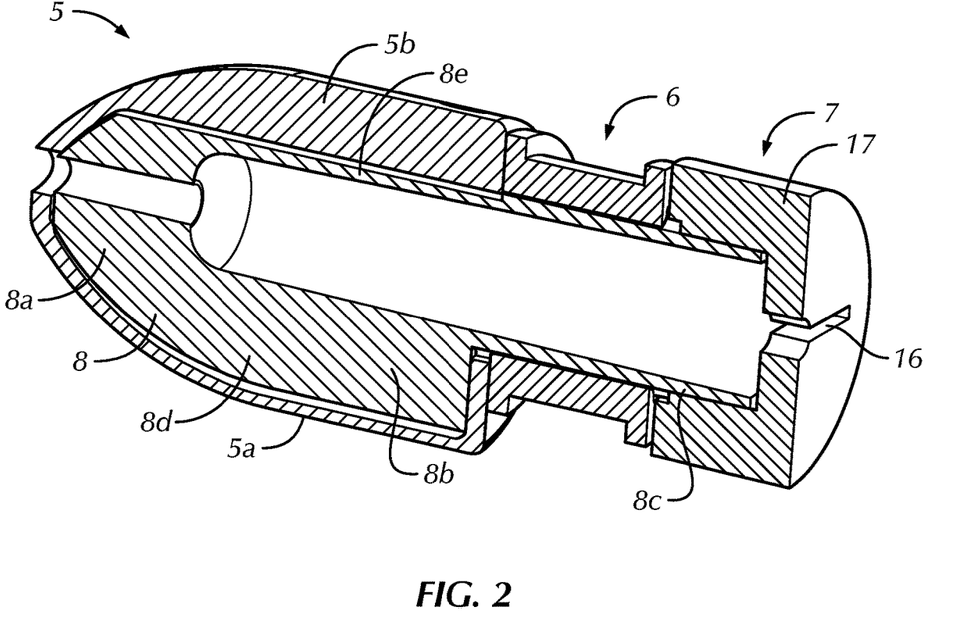
FIG. 2 illustrates a cross-sectional, side perspective view of components of the fishing lure of FIG. 1.

The preferred fishing lure 1 also includes removable hair 3, which can be made of nylon or made of elastomers and may be constructed having various lengths, densities of hair, colors and other variations based on user and designer preferences. These different lengths, densities of hair, colors and other variations may result in first, second, third and more removable hair 3 and an associated hair collar 6. The removable hair 3 is connected to the hair collar 6, which preferably snaps into the central body 8 to secure the hair 3 and the hair collar 6 to the central body 8 during use or in the mounted configuration (FIG. 2). The preferred fishing lure 1 also includes a stabilizer or ballyhoo stabilizer 7 that snaps into the central body 8 or snaps onto the rear 8c of the central body 8 during use to further secure the hair collar 6 and hair 3 to the central body 8 and facilitate connection of bait to the preferred fishing lure 1. The hair 3 and hair collar 6 are mounted between a stabilizer 7 and the elastomer cover 5 in the mounted configuration and are removable from the central body 8 such that the hair 3 and hair collar 6 may be removed and replaced to change the appearance of the fishing lure 1 for different fishing conditions. For example, a first hair 3 and hair collar 6 may be removed and replaced by a second hair 3 and hair collar 6 with a different color, size or shape or the hair 3 may have the appearance of elastomer tentacles.

Referring to FIG. 2, the assembly of the preferred fishing lure 1 with the ballyhoo stabilizer 7 includes the elastomer cover 5 positioned over the central body 8. The hair collar 6 is connected to the central body 8 between the elastomer cover 5 and the stabilizer 7 with the hair 3 attached to the hair collar 6. The central body 8 is preferably constructed of a strong, high density material that is able to take on the general size and shape of the central body 8 and withstand the normal operating conditions of the central body 8. The strong, high density material may be comprised of lead, tin, bismuth, steel, ceramic, tungsten-nickel alloy or other relatively strong and stiff materials that are able to take on the general size and shape of the central body 8, perform the preferred functions of the central body 8 and withstand the relatively harsh operating conditions of the central body 8. The central body 8 includes a lower portion 8d and a top portion 8e with the lower portion 8d weighted so that the lower portion 8d is heavier than the top portion 8e, thereby causing the fishing lure 1 to track in the water with the eyes 2 generally positioned on opposing sides and generally preventing or limiting spinning of the fishing lure 1 as the fishing lure 1 tracks through the water. The weighting of the central body 8 with the heavier lower portion 8d and the lighter top portion 8e results in a keeled central body 8. The lower portion 8d generally remains below the upper portion 8e as the fishing lure 1 moves through the water during use. Likewise, the elastomer cover 5 has a relatively thin bottom portion 5a and a thicker upper portion 5b such that the fishing lure 1 has a generally bullet-shaped appearance or symmetrical appearance with the lower portion 8d of the central body 8 providing weight to limit spinning or rotation of the fishing lure 1 during use because of the bottom weighting of the lower portion 8d, thereby resulting in the keeled configuration of the central body 8 and the fishing lure 1. The elastomer cover 5 covers the nose 8a and the middle portion 8b of the central body 8 in the mounted configuration. The elastomer cover 5 preferably has a circular cross-sectional shape when mounted to the central body in the mounted configuration.

Figure 3:
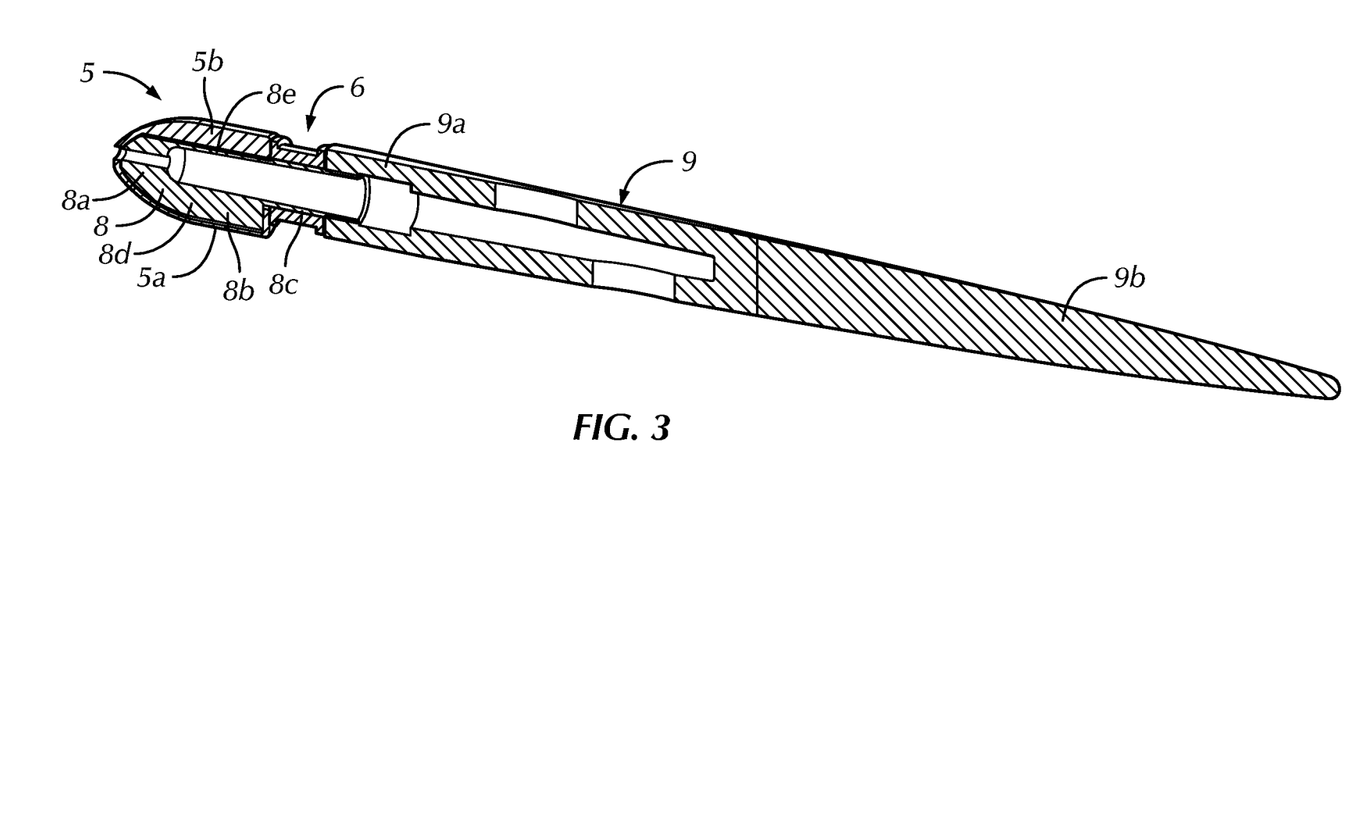
FIG. 3 illustrates a cross-sectional, side perspective view of additional components of the fishing lure of FIG. 1.
Figure 4:
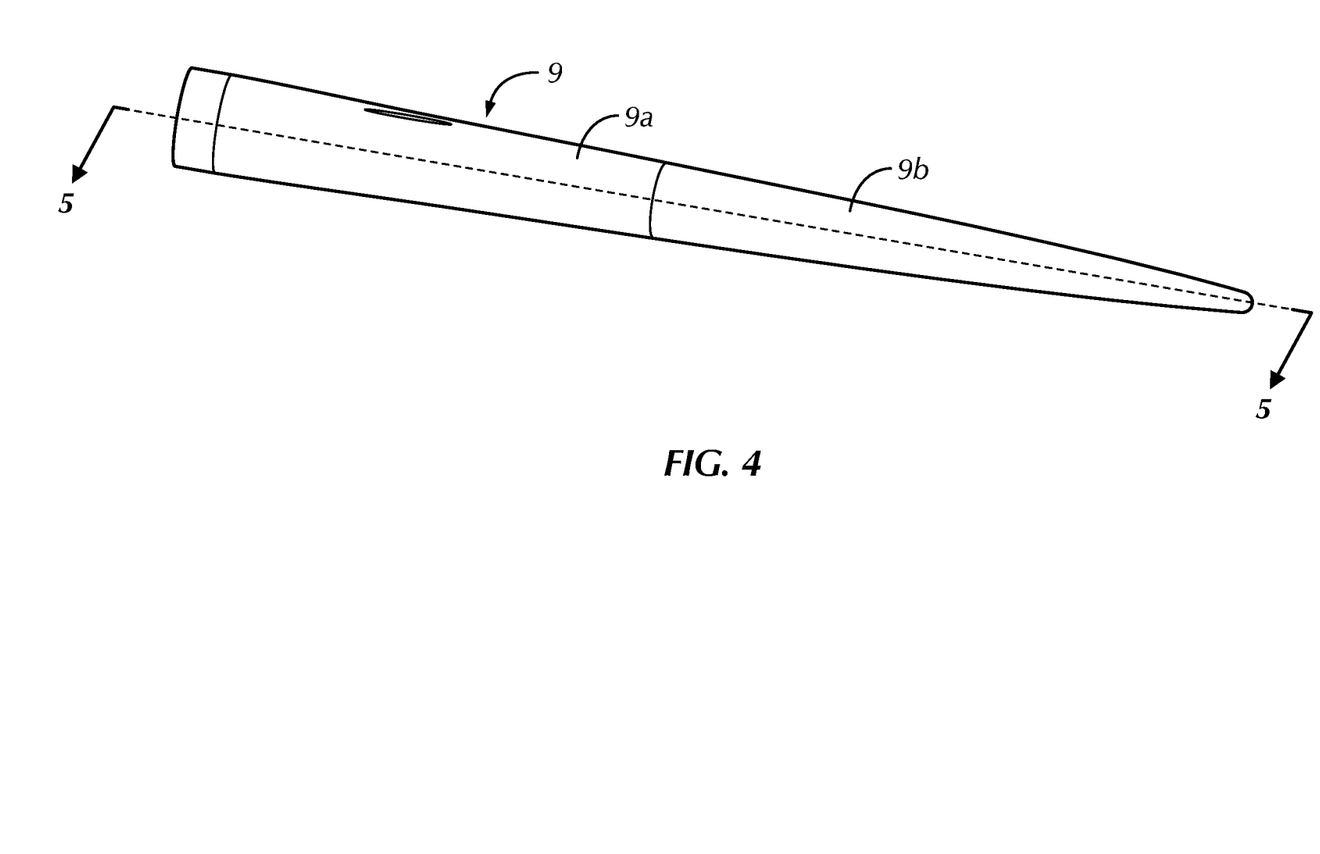
FIG. 4 illustrates a side perspective view of a tail of the fishing lure of FIG. 1.
Figure 5:
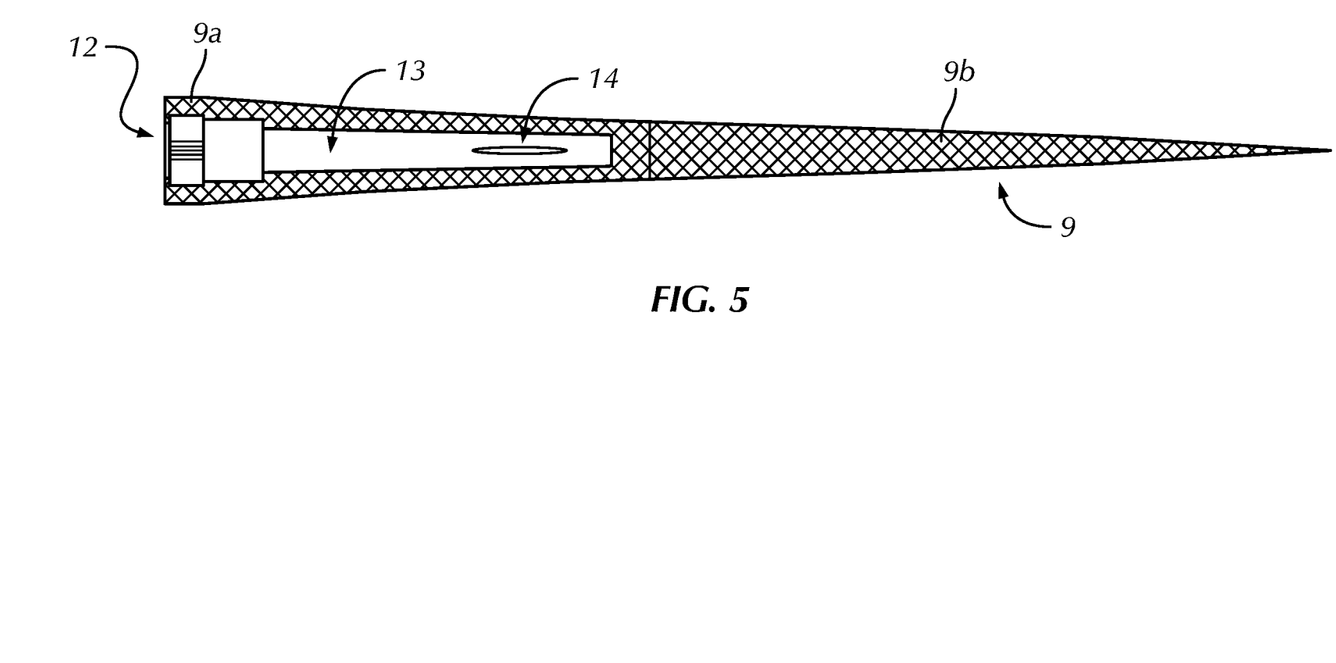
FIG. 5 illustrates a cross-sectional view of the tail of FIG. 4, taken along line 5-5 of FIG. 4.

Referring to FIGS. 3-5, the preferred fishing lure 1 also includes an elastomer tail 9 connected directly to a rear neck of the central body 8. The elastomer tail 9 preferably comprises a relatively long polymeric body. The elastomer tail 9 is preferably constructed of an elastomeric material that is relatively flexible, may take on the general size and shape of the tail 9, withstand the normal operating conditions of the tail 9 and perform the preferred functions of the tail 9, as is described herein. The preferred tail 9 is constructed of silicone materials having two different hardnesses, including a first portion and a second portion, but is not so limited and may be constructed of different polymeric or elastomeric materials that are able to take on the size and shape of the tail 9, withstand the normal operating conditions of the tail 9 and perform the preferred functions of the tail 9, as described herein.

Referring to FIGS. 4 and 5, the tail 9 is preferably constructed of a first portion 9a having a greater hardness than a second portion 9b. The first portion 9a may be a front portion 9a and the second portion 9b may be a rear portion 9b but the tail 9 is not so limited and may be otherwise constructed with the different hardness materials being otherwise positioned or located, such as a first portion being located on an inner portion of the tail and the second portion being located at an outer portion of the tail 9, the first portion 9a being positioned at a front of the tail 9 and the second portion 9b being positioned at a rear of the tail 9 or other configurations and locating of the different portions 9a, 9b or having additional portions with different hardnesses. The preferred relatively hard front portion 9a is constructed for secure attachment directly to a rear neck of the central body 8. The softer rear portion 9b provides a realistic appearance as it flows through the water during trolling and the harder front portion 9a provides a relatively strong and secure snap-fit connection. The tail 9 is not limited to including the relatively hard front portion 9a and the relatively soft rear portion 9b, but this configuration is preferred for the fishing lure 1. The front and rear portions 9a, 9b are preferably co-molded or co-formed into the desired shape. The tail 9 also preferably includes a snap mechanism or snap fit mechanism 12, a molded hook cavity 13 and an exit point 14 for the hook. The molded hook cavity 13 is preferably formed in the front portion 9a between the snap fit mechanism 12 and the rear portion 9b. The molded hook cavity 13 and exit point 14 accommodate insertion of a hook (not shown) into and through the tail 9 without necessarily damaging the tail 9 by force fitting the central body 8 or hook through any portion of the tail 9 during assembly. The exit point 14 is preferably formed in the front portion 9a and extends between an external surface of the front portion 9a and the molded hook cavity 13. The tail 9, therefore, may be removably attached to the central body 8 multiple times without significantly impacting the function or operation of the tail 9. The tail 9 is preferably releasably lockable to the central body 8 by connecting the snap fit mechanism 12 to the rear 8c of the central body 8. The snap fit mechanism 12 of the elastomer tail 9 is preferably includes in the front portion 9a that has a first hardness that is greater than a second hardness of the rear portion 9b of the tail 9. The greater first hardness of the front portion 9a accommodates the removable connection and locking feature of the snap fit mechanism 12 to releasably connect to the central body 8 and the lesser second hardness of the rear portion 9b simulates the natural appearance of a fish or bait fish as the fishing lure 1 is pulled or drawn through the water during use.

Figure 6:
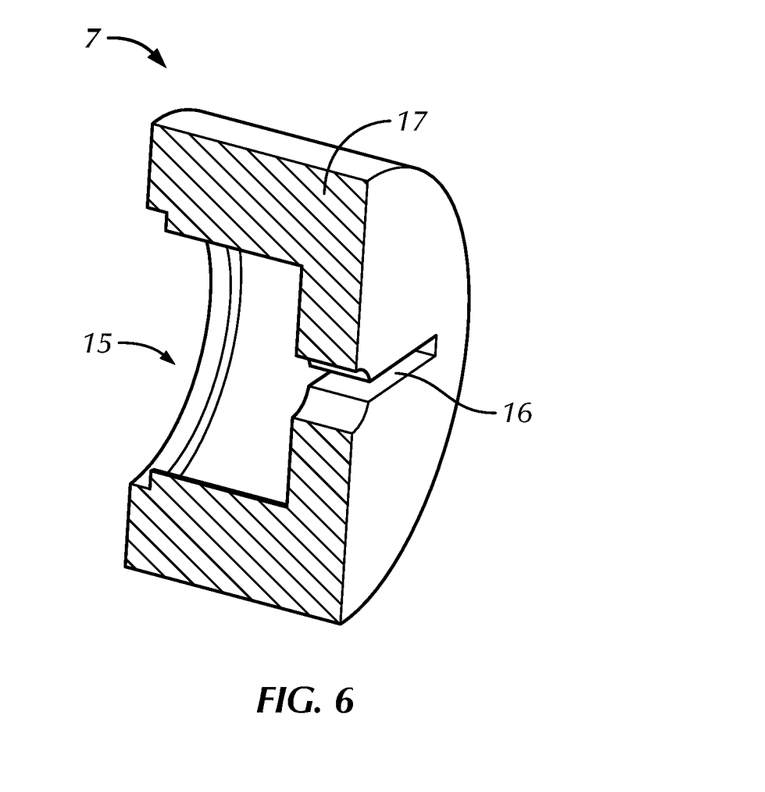
FIG. 6 illustrates a cross-sectional view of a stabilizer of the fishing lure of FIG. 1, taking along line X-X of FIG. 1.

Referring to FIG. 6, the stabilizer 7 includes a snap fit mechanism 15, a slot 16 for accommodating a hook that engages the bait fish bill and a body 17. The hook may extend through the slot 16 such that the bill of the bait fish may be engaged or connected to the hook to secure the bait fish to the fishing lure 1 to further attract fish to the fishing lure 1 while trolling. The snap fit mechanism 15 is configured to releasably secure or releasably mount the stabilizer 7 to the central body 8 by snap fitting the stabilizer 7 to the rear 8c of the central body 8. The stabilizer 7 is not limited to including the snap fit mechanism 15 to secure the stabilizer 7 to the central body 8 and may include a clamping mechanism, a threaded attachment or other connection mechanism to removably secure the stabilizer 7 to the central body 8.

It will be appreciated by those skilled in the art that changes could be made to the preferred embodiment of the fishing lure 1 described above without departing from the broad inventive concept thereof. It is understood, therefore, that this invention is not limited to the particular embodiment disclosed, but it is intended to cover modifications within the spirit and scope of the present invention as defined by the present description.

We claim:

1. A tail for a fishing lure for removable connection to a central body of the fishing lure, the tail comprising:
   a first portion having a first hardness, the first portion including a snap fit mechanism for removable connection to the central body, the snap fit mechanism formed in a first end of the first portion; and
   a second portion extending from a second end of the first portion that is opposite the first end, the second portion having a second hardness, the first hardness being greater than the second hardness, wherein the snap fit mechanism is disposed in a front cavity formed in the first end of the first portion; and wherein a molded hook cavity is formed in the first portion, the molded hook cavity open to the front cavity and extending into the second portion.

2. The tail of claim 1, wherein the first portion is comprised of a front portion and the second portion is comprised of a rear portion, the front and rear portions comprise a long polymeric body.

3. The tail of claim 1, wherein an exit point is formed in the first portion extending between an external surface of the first portion and the molded hook cavity.

4. The tail of claim 2, further comprising:
a first exit point extending between an external surface of the tail and the molded hook cavity, the molded hook cavity formed in the long polymeric body.

5. The tail of claim 4 further comprising:
a second exit point extending between the external surface of the tail and the molded hook cavity.

6. The tail of claim 5, wherein the first exit point and the second exit point extend out of the molded hook cavity in opposite directions.

7. The tail of claim 5, wherein the first exit point is closer to the snap fit mechanism than the second exit point.

8. The tail of claim 1, wherein the second portion is fabricated from silicone.

9. A tail for a fishing lure, the tail comprising:
a hookless body having an external surface, the body comprising:
  a front portion having a front end;
  a snap fit mechanism located in the front end of the front portion, the snap fit mechanism including a front cavity;
  a molded hook cavity extending into the body from the front cavity; and
  an elongated rear portion extending from a rear end of the front portion, the rear portion having a hardness less than a hardness of the snap fit mechanism.

10. The tail of claim 9, wherein the snap fit mechanism, the front portion and the elongated rear portion are co-formed as a unitary structure.

11. The tail of claim 10, wherein the front portion is a polymer and the rear portion is an elastomer.

12. The tail of claim 10, wherein the rear portion is constructed of a silicone material.

13. The tail of claim 9, further comprising:
a first hook exit passage extending from the hook cavity through the external surface of the body.

14. The tail of claim 13 further comprising:
a second hook exit passage extending from the hook cavity through the external surface of the body.

15. The tail of claim 14, wherein the first hook exit passage and the second hook exit passage are disposed on opposite sides of the external surface of the body.

16. The tail of claim 14, wherein the first hook exit passage is closer to the front end of the front portion than the second hook exit passage.

17. A fishing lure comprising:
a central body having a hook extending therefrom, the central body snap fit with the snap fit mechanism of the tail of claim 13.

18. A tail for a fishing lure, the tail comprising:
a hookless body having an external surface extending between front and rear ends of the body, the body comprising:
  a polymeric front portion having a front end, the front end of the front portion defining the front end of the body;
  a snap fit cavity formed in a front end of the front portion, the snap fit cavity configured to snap fit to a central body;
  an elongated elastomeric rear portion extending from the front portion, a free end of the rear portion forming the rear end of the body, the free end of the rear portion having a hardness less than a hardness of a material forming the snap fit cavity;
  a hook cavity formed in the body and open to the snap fit cavity; and
  a first hook exit passage extending from the hook cavity through the external surface of the body, wherein the front portion, the rear portion, the snap fit cavity, the hook cavity, and the first hook exit passage are co-molded as a unitary structure.

19. The tail of claim 18, wherein the rear portion is fabricated from silicon.

20. The tail of claim 18 further comprising:
a second hook exit passage extending from the hook cavity through the external surface of the body.

21. The tail of claim 20, wherein the first hook exit passage and the second hook exit passage are disposed on opposite sides of the external surface of the body.

22. The tail of claim 20, wherein the first hook exit passage is closer to the snap fit cavity than the second hook exit passage.

23. The tail of claim 18, wherein a hardness of the material defining the first hook exit passage has a hardness greater than the hardness of the free end of the rear portion.

* * * * *